United States Patent
Bagley et al.

(10) Patent No.: US 6,259,848 B1
(45) Date of Patent: Jul. 10, 2001

(54) PROPAGATING TEMPORAL OPTICAL SOLITONS IN A PLANAR LIGHTGUIDE CIRCUIT

(75) Inventors: Brian G. Bagley, 16474 W. River Rd., Bowling Green, OH (US) 43402; Robert T. Deck, Toledo, OH (US); Mirko G. Mirkov, Chelmsford, MA (US); Anca L. Sala, Sylvania, OH (US)

(73) Assignee: Brian G. Bagley, Bowling Green, OH (US)

( * ) Notice: Subject to any disclaimer, the term of this patent is extended or adjusted under 35 U.S.C. 154(b) by 0 days.

(21) Appl. No.: 09/169,859

(22) Filed: Oct. 10, 1998

(51) Int. Cl.[7] .................................................. G02B 6/10
(52) U.S. Cl. ......................... 385/132; 385/129; 385/123
(58) Field of Search ................................. 385/15, 24, 16, 385/17, 50, 48, 47, 49, 42, 45, 122–129, 132

(56) References Cited

U.S. PATENT DOCUMENTS

| | | |
|---|---|---|
| 4,406,516 | 9/1983 | Hasegawa . |
| 4,558,921 | 12/1985 | Hasegawa et al. . |
| 4,700,339 | 10/1987 | Gordon et al. . |
| 5,684,615 | * 11/1997 | Blow et al. .............. 385/24 |
| 5,767,998 | 6/1998 | Hasegawa et al. . |

OTHER PUBLICATIONS

A. Hasegawa & Y. Kodama, "Solitons in Optical Communications" Claredon Press 1995.

A.L. Sala, M.G. Mirkov, B.G. Bagley, R.T. Deck "Derivation of Dimensional & Material Requirements for Propogating and Processing of Temporal Optical Solitans . . . " Appl. Opt. 36, 7846–52 (1997) & Errutum.

D. Marcuse "Light Transmission Optics" Van Nostrand Reinhold ( ).

F. Ladouceur & J.D. Love "Silica–based Buried Channel Waveguides . . . " Chapman & Hall 1996.

* cited by examiner

Primary Examiner—Phan T. H. Palmer
(74) Attorney, Agent, or Firm—B J Associates; Bolesh J. Skutnik

(57) ABSTRACT

Planar waveguide devices are described which function as elements of a soliton transmission communications system operating at a selected central wavelength. These devices have at least one optical channel waveguide whose core has a refractive index and dielectric constant with a dependence on the optical signal intensity which can balance a negative dispersion in the waveguide at dimensions compatible with monomode transmission of the selected central wavelength. It is a property of such a waveguide that if the input is an optical soliton, the output will also be a soliton. Such circuits are useful at the input and output of a soliton transmitting fiber as part of a high bit-rate (broadband) communications system.

5 Claims, 4 Drawing Sheets

PROPAGATING TEMPORAL OPTICAL SOLITONS IN A PLANAR LIGHTGUIDE CIRCUIT

BACKGROUND OF THE INVENTION

1. Field of the Invention

This invention pertains to components of a high bit-rate monomode optical communication system present in a digital transmission system. More specifically, it pertains to optical channel waveguides in planar lightguide circuits which can propagate and process temporal optical soliton signals prior to their entrance to, or at the exit from, an optical fiber.

2. Prior Art Statement

In a modern optical communications system there are two aspects which limit performance. The first of these is optical attenuation due to absorption or scattering by the transmission medium. Attenuation limits how far a signal can travel in an optical fiber transmission line before it requires amplification. The second aspect is signal pulse broadening due to dispersion, which limits the bit-rate, or bandwidth, because of a loss of detector discrimination between adjacent pulses in a communication bit stream.

The aim of the present invention is only digital signal systems in which the signal consists of the presence or absence of pulses within a pulse-bit stream. It is not concerned with analog systems in which the signal consists of a varying amplitude of an electromagnetic wave.

The current practice for long distance optical communications systems requires the use of "repeaters" which involves two optoelectronic conversions. Photons of an optical signal travelling in the optical fiber are converted, through use of a photodetector, to an electric signal, i.e. electrons. The signal is electrically amplified to correct for absorption and electrically reshaped to correct for dispersion and the resulting signal converted back to photons, e.g. through use of a diode laser, for transmission through the next optical fiber link.

Recently, however, erbium doped optical amplifiers have been implemented into some fiber optic transmission systems. This innovation has the marked advantage that amplification, to correct for attenuation losses in long distance systems, occurs without the need to convert to electrons. The second problem, signal dispersion, is not addressed by these optical amplifiers.

Clearly there is considerable technological, as well as commercial, advantage in eliminating the periodic repeaters still required in an optically amplified fiber optic communication system to reshape signals which have broadened through dispersion. Long distance or high bit-rate digital communications applications would benefit from an optical system in which no signal pulse broadening due to dispersion occurs.

Dispersion, which leads to pulse broadening, has two components. The first is material dispersion which is a bulk property of the waveguide material system and its composition. The second is termed waveguide dispersion. It is a function of the waveguide's geometry, its dimensions and the profile of the material composition within the waveguide. Taken together the two components are generally termed chromatic dispersion.

To transmit signals over long distances or for high bit-rate transmission, in general, it is necessary that a pulse does not change shape with time. This in turn requires that there be a way to compensate for the naturally occurring pulse broadening due to chromatic dispersion within the optical transmission system.

Hasegawa, U.S. Pat. No. 4,406,516, discloses that a solution to this dispersion problem lies in a fiberguide communications system that propagates temporal optical solitons as the digital signal. A temporal optical soliton occurs when the pulse broadening due to chromatic dispersion is balanced by the contraction due to a nonlinear dependence of the transmission medium's index of refraction on light intensity. In '516 the conditions necessary to achieve a fiberguide communications system which can propagate temporal optical soliton pulses is disclosed.

Hasegawa and Kodama, U.S. Pat. No. 4,558,921, disclose a repeaterless optical fiber communications system in which soliton pulse attenuation is non-electronically amplified by appropriate amounts at appropriate intervals. Refinements in this basic repeaterless soliton communications system include: wavelength division multiplexing in U.S. Pat. Nos. 4,700,339 and 5,767,998; and minimizing soliton-soliton interactions so as to increase bandwidth in U.S. Pat. No. 5,684,615. All of this prior art concerns fiberguides (round optical waveguides or optical fibers). Indeed, the design of the fiber aspects of a communications system have reached a high level of sophistication (Hasegawa and Kodama, *Solitons in Optical Communications*, Claredon Press (1995)).

Inputting, and often outputting too, of digital signals to and from optical fiber transmission lines generally requires that the signals be processed in some way. Examples of signal processing include power splitting of the signal, adding a signal to an existing bit stream or extracting a desired signal from an existing bit stream. Optical circuits which serve these processing functions are best fabricated in planar configurations using standard fabrication procedures and techniques developed for the processing of modern electronic integrated circuits. These optical circuits, generally termed planar lightguide circuits, have as a fundamental element a channel waveguide whose function is to transmit (propagate) the optical signal throughout the circuit. It is a consequence of the fabrication procedure that a channel waveguide will have a rectangular (or square) cross section. The prior art has dealt with waveguides having circular cross sections but not rectangular ones. Soliton propagation, being strongly dependent on the geometry of the waveguide, cannot be predicted for channel waveguides by following the criteria set forth for optical fibers.

Furthermore, because the digital signals are confined within a waveguide having two small dimensions and one large dimension, studies on spatial solitons have no bearing on the problems of soliton transmission through such waveguides. Temporal solitons are the vehicle for transmitting digital signals without pulse broadening, because they do not change their shape while propagating with time. Spatial solitons, in contrast, employ nonlinearity in optical properties to stabilize a beam shape spatially in a medium with three large, or at least two large, dimensions.

The problem presented in achieving a commercially and technically successful digital optical communications system for long distance communication or high bit-rate transmission is: to design not only optical fibers with necessary dimensions and optical properties and signal power to propagate temporal solitons, i.e. sustain temporal soliton transmission (prior art), but to also provide planar lightguide circuits containing channel waveguides which can propagate temporal optical solitons and are compatible with optical fiber transmission lines. The present invention provides a solution to this latter problem.

OBJECTS AND SUMMARY OF THE INVENTION

It is the object of this invention to provide a planar lightguide circuit having optical channel waveguides suitable for the propagation of temporal optical solitons in digital communications systems.

It is a further object of this invention to provide a planar lightguide circuit having optical channel waveguides suitable for reshaping a non-soliton input signal into a soliton signal within the planar lightguide circuit.

Briefly stated, the present invention provides planar waveguide devices which function as elements of a soliton transmission communications system operating at a selected central wavelength. These devices have at least one optical channel waveguide whose core has a refractive index and dielectric constant with a dependence on the optical signal intensity which can balance a negative dispersion in the waveguide at dimensions compatible with monomode transmission of the selected central wavelength. It is a property of such a waveguide that if the input is an optical soliton, the output will also be a soliton. Such circuits are useful at the input and output of a soliton transmitting fiber as part of a high bit-rate (broadband) communications system.

The above and other objects, features and advantages of the present invention will become apparent from the following description read in conjunction with the accompanying drawings.

DESCRIPTION OF PREFERRED EMBODIMENTS OF THE INVENTION

In the present invention, planar lightguide circuits having optical channel waveguides with rectangular cross-sections are described. These waveguides have the property that they can propagate fundamental temporal optical solitons. A planar lightguide circuit, also known as an optical integrated circuit or silicon optical bench (when silicon is the substrate), is useful for signal processing.

Figure 1:
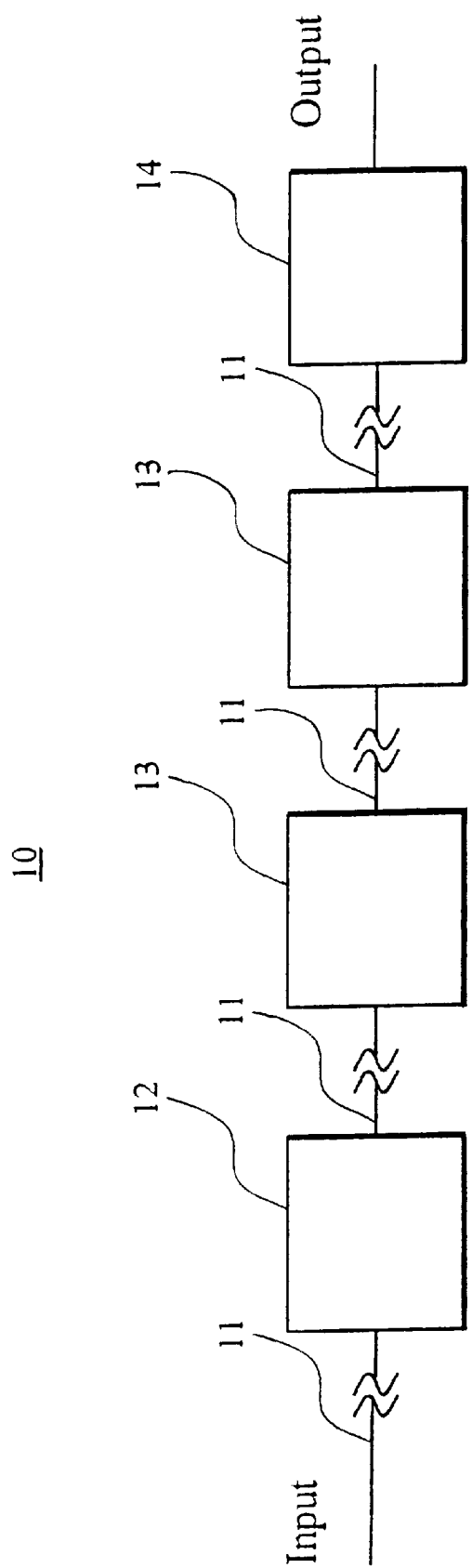
FIG. 1 schematically shows an exemplary optical communications system for the practice of the invention.

A section of an optical communications system including embodiments of the present invention is depicted in FIG. 1. Planar lightguide circuits can serve these functions at input 12 or at output 14 points of optical fiber 11 in a high bit-rate (i.e. broadband) optical communication system, including optical amplifier 13. Because of the technological advantages of erbium doped optical amplifiers and the low absorption loss of silica and silica-based materials, the preferred signal wavelength is in the range, 1.55 ±0.06 μm. The invention, however, is not limited to this wavelength range.

Figure 2:
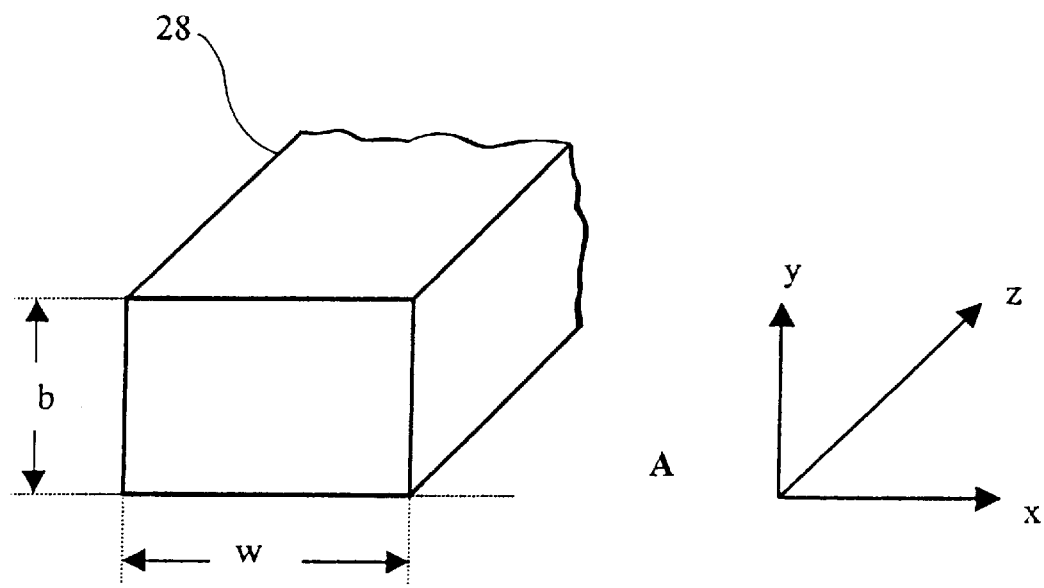
FIG. 2 is a representation of a optical channel waveguide having a rectangular cross section and whose long axis has a planar geometry. The upper figure, A, is a three-dimensional representation and the lower figure, B, is a cross-section.
Figure 2:
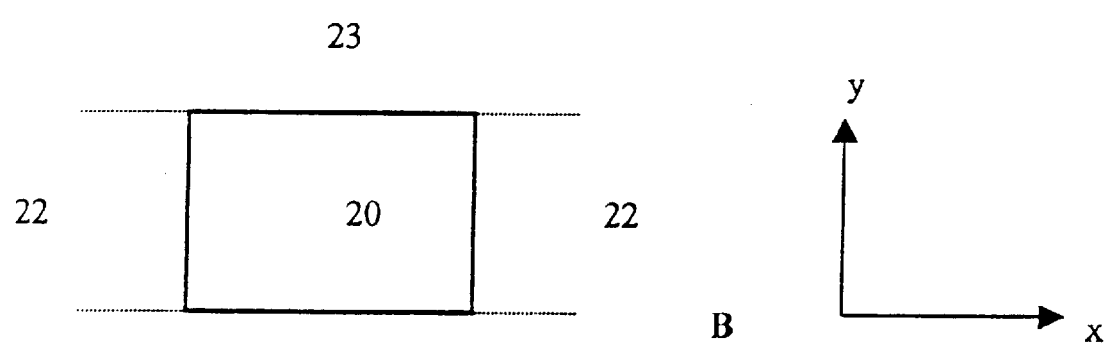

Central to the invention is a planar optical channel waveguide, 28 in FIG. 2A, in line with the optical fibers 11 comprising a majority of optical transmission line 10 within a communication system. As depicted in FIG. 2B, such an optical channel waveguide consists of core 20 within which a major portion of an optical signal power is transmitted, and cladding 21/22/23 which confines an optical signal to core 20. A consequence of current optical fiber manufacture is that a fiber waveguide core in an optical fiber has a cylindrical geometry. On the other hand, a consequence of the fabrication of a planar lightguide circuit, using standard lithographic techniques and an anisotropic etching process (e.g. ion milling), is that a planar waveguide core in a signal processing element will have a rectangular geometry as depicted in FIG. 2. The waveguides of interest in the present invention, generally termed channel waveguides, have one long dimension along the propagation direction and two small transverse dimensions. Key to the invention is that the conditions necessary for the propagation of a temporal soliton in an optical waveguide are geometry dependant.

In a planar lightguide circuit, the optical waveguides (lightguides), which can be straight or curved, are fabricated on the major surface of a supporting substrate. The substrate plays the role of a mechanical support for the otherwise fragile lightguide circuit. In addition, it can also play the role of a fixture to which input and output fibers are attached so as to optically couple cores of an input/output fiber to the cores of the planar lightguide circuit.

Figure 3:
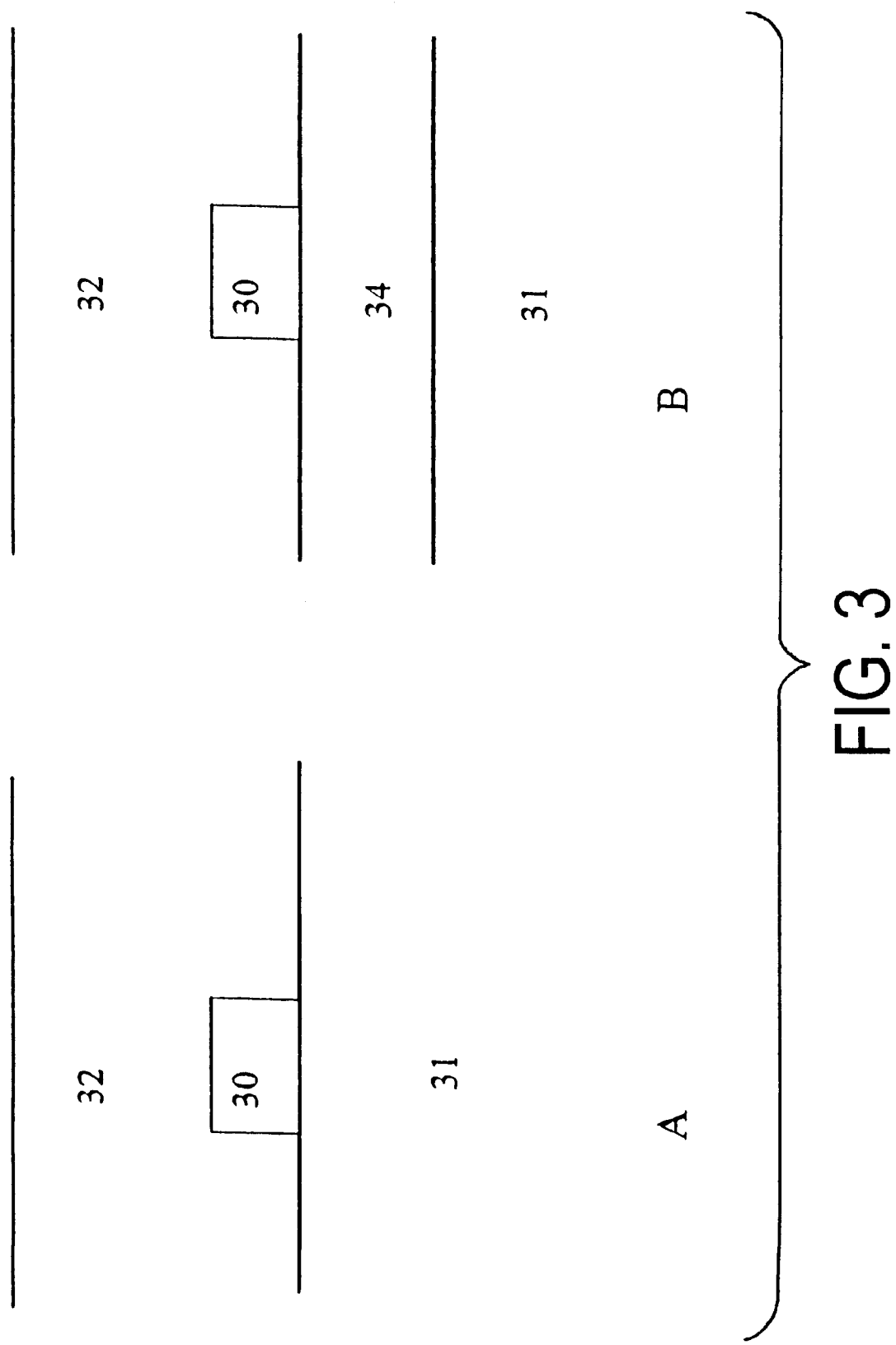
FIG. 3 is a cross-sectional view of two methods, FIG. 3A and FIG. 3B of practicing the invention based on the characteristics of the substrate material.

Two different fabrication procedures, leading to the structures given in FIG. 3, are used depending upon the properties of the substrate material. If substrate 31 has optical properties appropriate to be a waveguide cladding (e.g. a borosilicate glass wafer), then it can function as a substrate and cladding. In this case, a film of the waveguide core material of appropriate composition and thickness, as specified by this invention, is deposited over the entire major surface of the substrate using standard thin or thick film deposition techniques such as physical evaporation, chemical vapor deposition or flame hydrolysis. Standard lithographic techniques and etching processes are then used to pattern the waveguides. To pattern means to define the widths of the waveguides according to the present invention and to define the lightguide circuit, including both straight and curved optical waveguides, depending upon its function in the overall transmission system. A film, of appropriate material and composition according to this invention, to serve as a cover cladding is then deposited over the patterned substrate and core material using standard thin and thick film deposition techniques. The result is a buried channel waveguide consisting of lightguiding core 30 completely surrounded by cladding material 31 and 32 as illustrated in FIG. 3A.

It is a consequence of standard lithographic and etching procedures that the cross-section of the waveguide will be rectangular (or square) and it is a consequence of the fabrication procedure that the lightguide circuit, consisting of one or more optical waveguides (straight or curved), will be planar and lie parallel to the substrate major surface.

The second method of fabrication is similar to that just described, except that the chosen substrate does not have optical properties appropriate for a cladding material. An example is the use of silicon as the substrate (sometimes termed a silicon optical bench). A marked advantage of a silicon substrate is that grooves (trenches) can be accurately etched into the substrate using well established etching techniques. Fixing the input/output optical fibers into these grooves provides a method for a very accurate alignment of waveguide cores of optical fibers with respect to the waveguide cores of the planar lightguide circuit. However, silicon cannot be in contact with the waveguide core (as is the substrate in the first considered fabrication procedure). Thus, in this second method of fabrication the first step is to deposit a layer of material appropriate as a cladding layer 34 over the major surface of substrate 31. The thickness of this layer must provide optical isolation from the substrate and is typically 5 µm or thicker. Thereafter the procedure is the same as in case 1; i.e. the core layer 30 is deposited, lithographically defined and etched, and final cladding layer 32 deposited. The final structure is seen in cross section in FIG. 3B. In this disclosure, optical waveguide, and lightguide are taken to be synonymous.

Electromagnetic signals can propagate in the form of solitons only in a material medium which exhibits a nonlinear polarization. In the case of the silica-based materials of concern in the present invention, this nonlinear polarization has a form consistent with a Kerr-type nonlinear index of refraction, given by $n=n_0+n_2 I$, where I is the intensity of the field in the medium, $n_0$ is the linear index of refraction and $n_2$ is the "Kerr" nonlinear index of refraction. Therefore, detailed determination of the choice of materials for the core and cladding, the waveguide dimensions, and the minimum power requires a solution of Maxwell's equations in the presence of a "Kerr" nonlinear polarization. These equations lead to a Nonlinear Schroedinger Equation for the time-dependent amplitude of the electromagnetic field in the medium. The method of solution of this equation for planar waveguides having rectangular (or square) cross-sections is contained in the technical paper by Sala, Mirkov, Bagley and Deck, (*Applied Optics* 36, 7846–52 (1997): Erratum, ibid., 37, 1626 (1998)) which is incorporated herein by reference.

There are a number of guidelines for the practice of this invention. First, to act as an optical waveguide, the material of choice for both the core and cladding must have low absorption loss (i.e. be highly transparent) at the communications wavelength of interest. The current use of erbium doped optical amplifiers for signal amplification dictates that the signal wavelength be in the range, 1.55±0.06 µm. Low absorption loss at this wavelength dictates that the material systems of interest are silica and silica-based alloys. Under different conditions the materials might be based on another material system.

The next requirement is that the refractive index of the core be greater than that of the cladding, such that the major portion of the signal power be confined and propagate in the core, while a small portion of the signal power, the evanescent field, propagates in the cladding.

These two requirements are the basic requirements for the fabrication of an optical waveguide. However, there are additional constraints on waveguides which can propagate temporal optical solitons. In the case of the materials considered here, having positive nonlinear indices of refraction, the first of these constraints is that the dispersion coefficient, $\beta''$, defined as the second derivative of the propagation vector of the guided light with respect to its angular frequency, ω, must have a negative value. Under this condition, if the input to the waveguide is a soliton, the output will be a soliton for any negative $\beta''$ subject to a signal power constraint discussed later. On the other hand, if the planar lightguide circuit is to play a more active role, such as in soliton switching or in reshaping a non-soliton signal pulse into a soliton, then the dispersion length of the optical soliton should be as short as possible to avoid a need for excessively large planar substrates. Because the reciprocal of the magnitude of $\beta''$ determines the dispersion length of a temporal soliton, large (negative) values of $\beta''$ allow temporal solitons to be formed (and switched) in short distances within an optical circuit, and maximally large negative values of $\beta''$ are therefore made preferable. In an optical circuit designed in this invention, values of $\beta''$ more negative than $-20$ ps$^2$/km are preferred. Here the magnitude of $\beta''$ depends upon the optical properties (dielectric constants) of the core, the optical properties of the cladding, and the dimensions of the core, as determined by a solution of the Nonlinear Schroedinger Equation (via the method described by Sala et al). There are, however, a number of guidelines which, in general, will yield a large negative value of $\beta''$. They are: (i) the core material must be nonlinear and dispersive having a linear index of refraction, $n_0$, in the range between 1.3 and 2.0; (ii) the nonlinear index of refraction, $n_2$, should lie in the range $(1-100)\times 10^{-16}$ cm$^2$/W, and the nonlinearity must have a fast response time, $10^{-15}$–$10^{-14}$ sec. (in order that the nonlinear response be effectively instantaneous compared to the time duration of the signal pulse); (iii) the central wavelength of the signal, $\lambda_c$ (e.g. 1.5 µm), must fall in the anomalous dispersion region of the material, and must coincide with a large negative value for the material dispersion. Given that the wavelength corresponding to zero dispersion in the material is denoted by $\lambda_0$, it is necessary that $\lambda_0 < \lambda_c$. The dispersive characteristics of a material can generally be described by the Sellmeier formula with 3 (or sometimes 5) terms in the sum. This formula has the form $$\varepsilon(\lambda) = 1 + \sum_{i=1}^{3} \frac{A_i \lambda^2}{(\lambda^2 - \lambda_i^2)}$$

where $A_i$ and $\lambda_i$ represent fitting parameters characteristic of a given material medium. If the dispersive properties of a given material are expressed by way of a three term Sellmeier relation with $\lambda_1 < \lambda_2 < \lambda_3$, a high negative value of the dispersion at $\lambda = \lambda_c$ can generally be obtained if $\lambda_3 > \lambda_c$ but close to $\lambda_c$.

The design requirements for the cladding material are less stringent than those for the core. The cladding material can be optically linear and non-dispersive, but it is preferred that it have dispersive properties similar to those of the core, and it can also be optically nonlinear, as is the core.

To ensure that the core is an appropriate optical waveguide, a restriction on the linear index of refraction, $n_0$, of the cladding follows from the requirements on the quantity $\Delta = (\epsilon_1 - \epsilon_2)/2\epsilon_1$, where $\epsilon_1$ is the dielectric constant of the core and $\epsilon_2$ is the dielectric constant of the cladding. For materials with low absorption loss at a particular wavelength of interest, as is the case in the present invention, the linear dielectric constant at a given wavelength equals $n_0^2$. For practice of this invention the requirement is that $0.003 \geq \Delta \geq 0.02$, with the lower values of $\Delta$ (from 0.003 to 0.01) being preferred.

The description thus far is appropriate for an optical waveguide which can support the propagation of temporal optical solitons in both monomode and multimode regions. Whereas there may exist applications in which soliton propagation in multimode waveguides is desired, the application embodied in large bandwidth (broadband) optical communications systems favors monomode waveguides supporting only solitons. Thus there is an additional single mode constraint on the dimensions, w and b, of the waveguide cross-section such that only fundamental temporal optical solitons can propagate. If the description has been complied with thus far, then often there is a well defined and rather narrow window in the cross-sectional dimensions appropriate for the application of this invention. This window, when it occurs, is defined at small dimensions by $\beta''$ becoming positive, and at larger dimensions by a violation of the monomode condition. Use of the slab approximation along each dimension of a square waveguide produces an approximate form for the condition on the dimensions of a square waveguide required for monomode propagation expressible as (D. Marcuse, *Light Tranmission Optics*, p.326–27, Van Nostrand Reinhold Co.(1995)):

$$w = b \leq \frac{1}{2} \frac{(\lambda_c - \Delta\lambda)}{\sqrt{\varepsilon_1 - \varepsilon_2}} \quad (a)$$

where $\Delta\lambda$ is the bandwidth of the signal at the central wavelength $\lambda_c$ and the other parameters were defined above. In contrast, an alternative analysis (F. Ladouceur and J. D. Love, *Silica-based Buried Channel Waveguides and Devices*, p16—7, 64—5, Chapman & Hall( 1996)), which accounts for the coupling between the simultaneous constraints of the guide's two transverse dimensions, provides a (less restrictive) condition on the dimensions expressible as:

$$w = b \leq \frac{2.13}{\pi} \frac{(\lambda_c - \Delta\lambda)}{\sqrt{\varepsilon_1 - \varepsilon_2}} \quad (b)$$

Here it is sufficient to emphasize only the existence of conditions on the dimensions of the waveguide for monomode soliton propagation; these conditions being approximated by the two inequalities given above. Whereas, the preferred geometry of the waveguide cross-section is square, the equality between w and b need not be accurate and, more generally, soliton propagation will occur when the ratio b/w has values in the range from 0.5 to 2.

At this point, a waveguide which has the ability to propagate monomode temporal optical solitons has been characterized. But whether or not a particular communications signal will propagate as a soliton is dependent on the satisfaction of one additional relationship expressible in the form $(2\pi/\lambda_c) P_0 T_0^2 = -\lambda''A_{\mathit{eff}}/n_2$ where $P_0$ is the peak power in the signal pulse, $T_0$ is the duration of the signal pulse and $A_{\mathit{eff}}$ is the nonlinear effective area and the other parameters as previously defined. If the input signal is a soliton, and this relationship is satisfied, the output will also be a soliton. If the input signal is not a soliton, but the signal power exceeds $P_0$ by approximately 5%, and the length of the waveguide exceeds the dispersion length, then the non-soliton input will reshape itself and exit as a soliton. Finally, if the input signal is not a soliton, and this power relationship is not satisfied, then the output will not be a soliton either.

EXAMPLE

An example waveguide consistent with the requirements of this invention can be formed from a square waveguide whose core material is an amorphous solid phosphosilicate of composition 9.1 mole % $P_2O_5$ and 90.9 mole % $SiO_2$. This material has bulk optical parameters; $n_0=1.4589$, $\lambda_0=1.274$ $\mu$m and $n_2=3\times10^{-16}$ cm$^2$/W. The cladding material is an amorphous solid borosilicate of composition 13.3 mole % $B_2O_3$ and 86.7 mole % $SiO_2$, having the optical parameters; $n_0=1.4386$, $\lambda_0=1.231$ $\mu$m and $n_2=3\times10^{-16}$ cm$^2$/W. For this core-cladding combination the relative index difference $\Delta$, is 1%. This information allows the construction of the graph in FIG. 4. The single mode cutoff condition on the transverse dimensions, b and w, of the waveguide, according to the inequality (b) above, is 4.193 $\mu$m (whereas the more restrictive condition, inequality (a) gives the cutoff as 3.09 $\mu$m). From FIG. 4 for a square waveguide of dimensions b=w=4.2 $\mu$m, $\beta''$ has the value −32(ps)$^2$/km at the wavelength $\lambda_c$ of 1.55 $\mu$m, and from the equation in the previous paragraph, the nonlinear effective area, $A_{\mathit{eff}}$ is 20 $\mu$m$^2$. A fundamental temporal optical soliton signal pulse with duration 100 femtoseconds, centered at $\lambda_c=1.55$ $\mu$m and with a peak power of 410 W will propagate in this waveguide without a change in shape.

Figure 4:
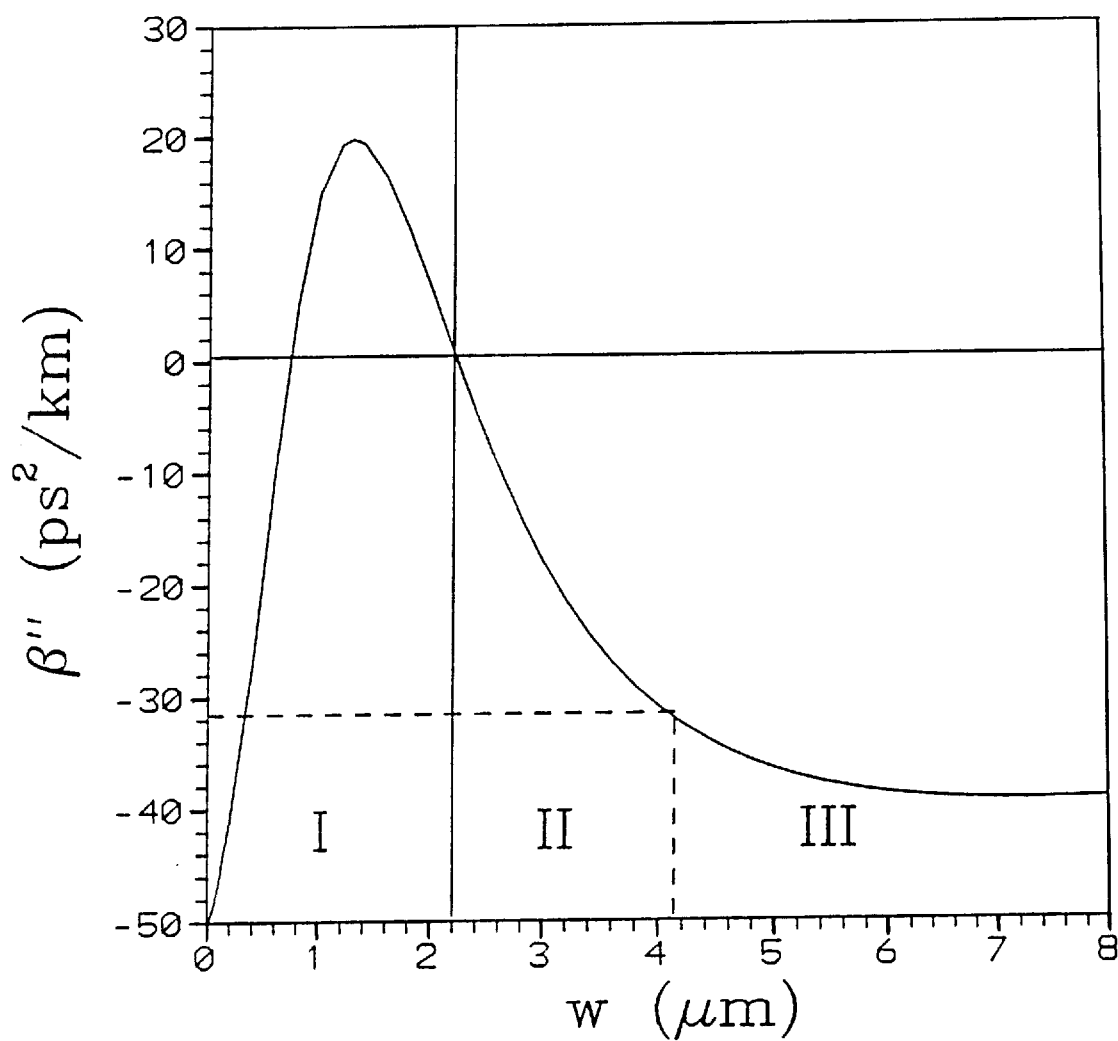
FIG. 4 is a graph of $\beta''$ versus the cross sectional dimension of a square waveguide whose core is a phosphosilicate glass, and whose cladding is a borosilicate glass.

For a square waveguide of side length w and this core/clad combination, the three regions of interest are also depicted on FIG. 4. For w less than 2.2 $\mu$m, region I, only non-solitons will propagate. For w greater than about 4.2 $\mu$m (=4.193 $\mu$m), region III, the occurrence of additional modes will cause the shape of the propagating soliton to change It is only in region II, where 2.2$\leq$w $\leq$4.2 $\mu$m, that fundamental temporal optical solitons will propagate.

Having described preferred embodiments of the invention with reference to the accompanying drawings. It is to be understood that the invention is not limited to the precise embodiments, and that various changes and modifications may be effected herein by those skilled in the art without departing from the scope or spirit of the invention as defined in the appended claims.

What is claimed is:

1. Planar waveguide devices which function as elements of a soliton transmission communications system operating at a central wavelength, $\lambda_c$, comprising:
   at least one optical channel waveguide within a planar lightguide circuit;
   said at least one optical channel waveguide having a core and a cladding;
   wherein said at least one optical channel waveguide has dimensions; b and w, and has optical parameters; loss, linear and nonlinear refractive indices for said core and said cladding, a negative dispersion coefficient, and dielectric constants for said core and said cladding, such that said waveguide can propagate temporal optical solitons through said communications system.

2. Planar waveguide devices according to claim 1, wherein said dispersion coefficient, $\beta''$, has a large negative value, preferably more negative than −20 (ps)$^2$/km.

3. Planar waveguide devices according to claim 1, wherein said at least one optical channel waveguide's dimensions of b and w, independently follow an inequality given as:

$$b, w < (2.13/\pi) \{(\lambda_c - \Delta\lambda)/(\epsilon_1 - \epsilon_2)^{0.5}\}$$

wherein $\Delta\lambda$ is defined as the bandwidth of a signal at said central wavelength $\lambda_c$, $\epsilon_1$ is the dielectric constant of said core and $\epsilon_2$ is the dielectric constant of said cladding.

4. Planar waveguide devices according to claim 3 wherein the ratio of said channel waveguide's dimensions b/w is between 0.5 and 2.0.

5. Planar waveguide devices according to claim 1 wherein said optical channel waveguide operates at a central wavelength of 1.55 $\mu$m and has dimensions, b=w=3.1 $\mu$m; said core has a composition of 9.1 mole % $P_2O_5$ and 90.9 mole % $SiO_2$; and said cladding has a composition of 13.3 mole % $B_2O_3$ and 86.7 mole % $SiO_2$.

\* \* \* \* \*